July 22, 1969
C. E. KENT
3,457,115
GAS-DEPOLARIZED ELECTRICAL POWER UNIT WITH FILTER MEANS
Filed Dec. 3, 1965
2 Sheets-Sheet 1
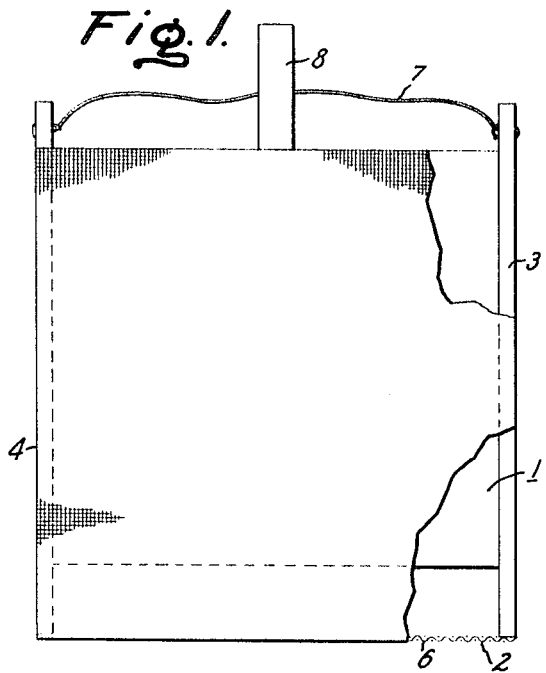
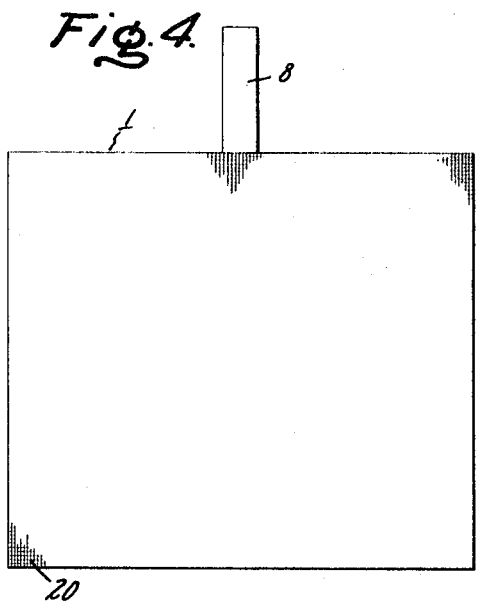
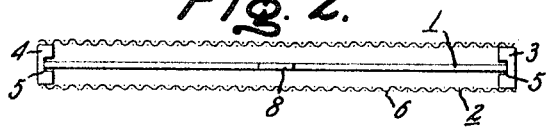
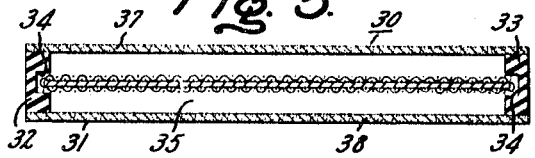
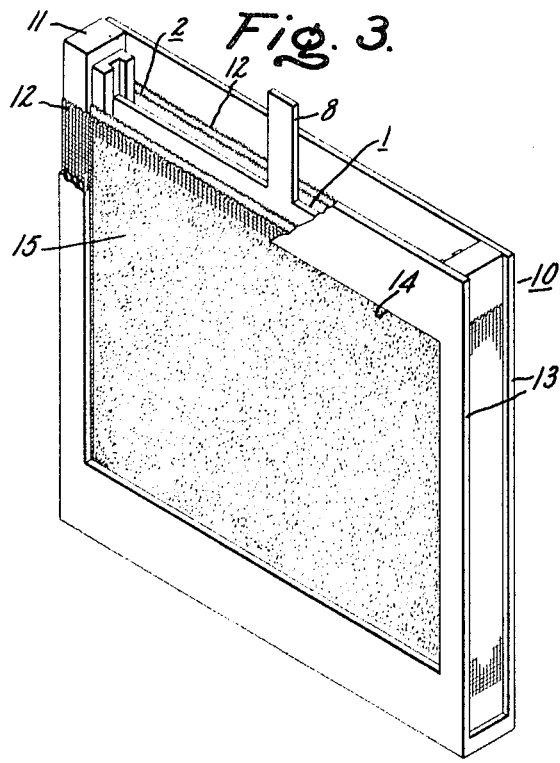
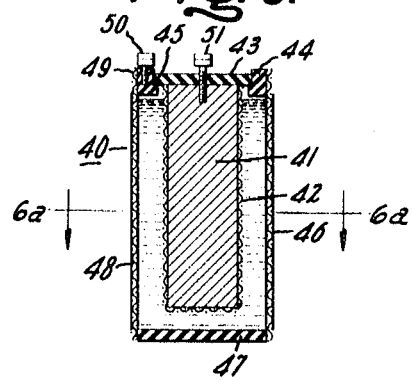
Inventor:
Clifford E. Kent,
by Carl O. Thomas
His Attorney.

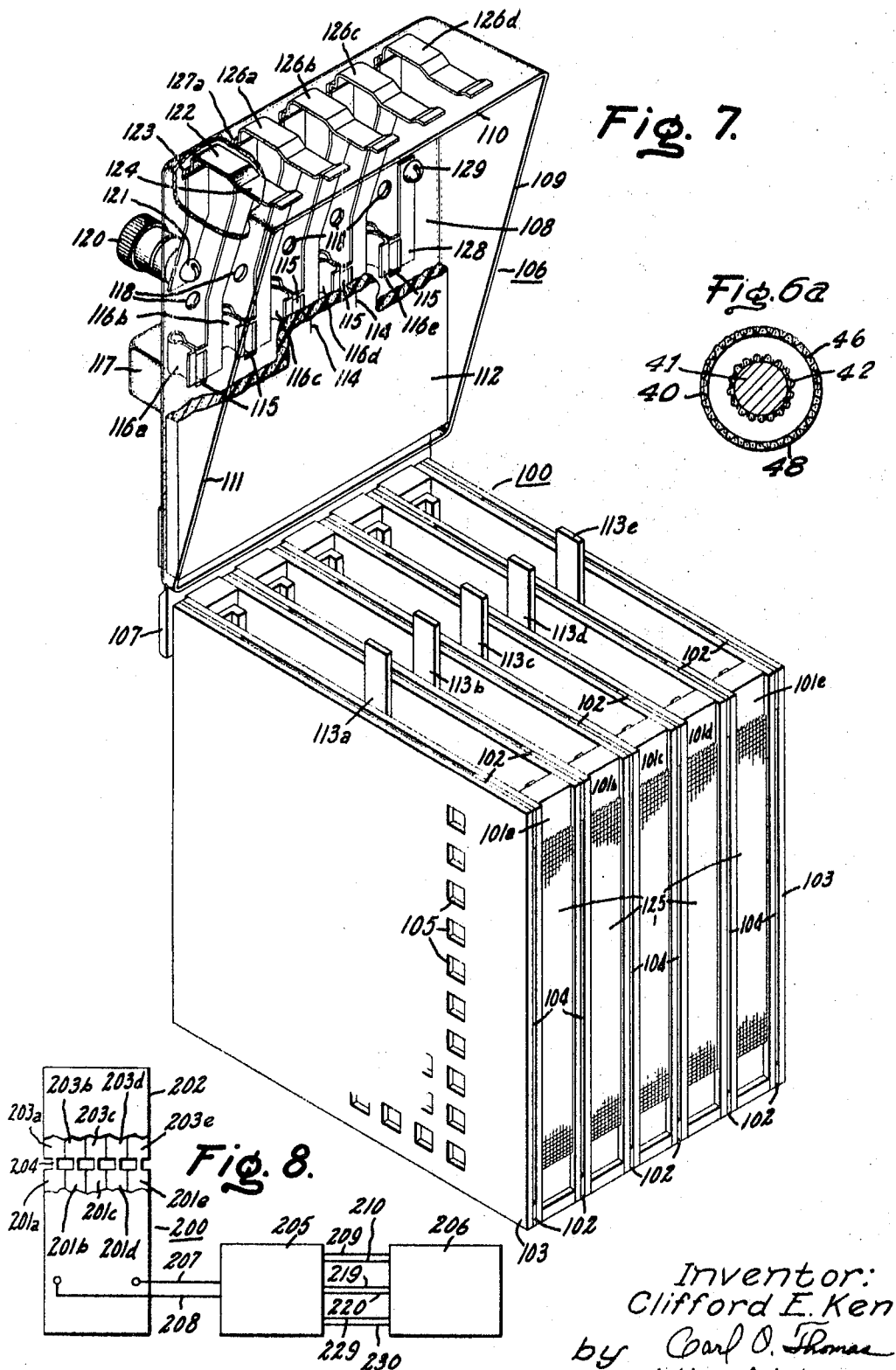

United States Patent Office

3,457,115
Patented July 22, 1969

3,457,115
GAS-DEPOLARIZED ELECTRICAL POWER UNIT WITH FILTER MEANS
Clifford E. Kent, Schenectady, N.Y., assignor to General Electric Company, a corporation of New York
Filed Dec. 3, 1965, Ser. No. 511,392
Int. Cl. H01m 29/04, 27/14
U.S. Cl. 136—86                           12 Claims

ABSTRACT OF THE DISCLOSURE

A gas-depolarized electrical power unit describes cells employing a precipitate producing solid metal anode positioned removably within a removable filter within a casing for confining an electrolyte. Such cells are also described which include at least one gas-depolarizing electrode as a portion of the casing. Further, such cells are provided with both the above anode structure and the above casing structure. Electrical power units are described which include a plurality of the above cells connected electrically.

---

My invention relates to a novel unit for supplying electrical power.

There exists today a burgeoning need by both the military and the general public for a convenient, low cost, manually portable source of electrical power. While dry cells have found wide acceptance for the very lowest electrical power requirements, these cells have remained unattractive for larger electrical power requirements because of the unfavorable ratios of cell weight to power and energy output. This is a disadvantage which dry cells share with all primary cells which are packaged to include all anode, cathode, and electrolyte reactions. Also, since all primary cells lack recharge capability, they generally exhibit a high cost per watt-hour delivered. This latter disadvantage is aggravated by the fact that such cells frequently suffer the further penalty of limited shelf life—i.e., deterioration as a function of time as well as of use.

In the interest of economy secondary cells such as the lead-acid battery are typically used to meet all but the very smallest electrical power requirements. For such cells, however, the weight to power ratio is so high as to substantially negate manual portability. Further, such cells are inconvenient to use for long periods since they require the presence of a recharging mechanism or else periodic transport to an auxiliary source of electrical power for recharging. Where continuous or substantially continuous electrical power delivery is required, replacement cells must be kept on hand for use during recharging. Another salient feature is that conventional secondary cells generally incorporate electrolyte of objectionable corrosivity. Still further, impurities in the electrolyte will adversely affect cell performance so that make-up electrolyte constituents must be transported with secondary cells to insure dependable performance in isolated areas.

The summation of the deficiencies, disadvantages, and inconveniences associated with conventional cells as electrical power sources has created a demand for an improved portable electrical power source. It is the object of my invention to provide an electrical power source which is convenient to use and which can be manufactured at low cost. It is a more specific object to provide a unit construction that is compact, rugged, and of light weight. It is an important object to provide a unit that can be quickly and repeatedly reactivated without electrical charging. It is another object to provide a unit utilizing a readily available and/or easily constituted electrolyte. It is a further object to provide a unit having a greatly extended shelf life.

These and other objects of my invention are accomplished by providing an electrical power source, which in one form is comprised of means for confining an aqueous electrolyte including an air electrode, an electropositive metal anode removably positioned within the confining means for contact with the aqueous electrolyte and spaced from the air electrode, and filter means removably positioned within the confining means enveloping the portion of the anode lying within the electrolyte. A specific advantage of my invention is that available surface water may be employed as an electrolyte or electrolyte constituent.

My invention may be better understood by reference to the following detailed description considered in conjunction with the drawings, in which FIGURE 1 is an elevation, partly in section, of an anode and a filter in combination;

FIGURE 2 is a plan view of the combination shown in FIGURE 1;

FIGURE 3 is a perspective view of a cell configuration;

FIGURE 4 is an elevation of an anode and a modified filter in combination;

FIGURE 5 is a horizontal section of a modified cell configuration;

FIGURE 6 is a vertical section of another modified cell configuration;

FIGURE 6a is a horizontal section of the cell shown in FIGURE 6 taken along line 6a—6a;

FIGURE 7 is a perspective view of an electrical power unit; and

FIGURE 8 is a schematic plan view of a modified electrical power unit in combination with a converter and an electrically powered device.

The basic concepts relating to gas depolarized electropositive metal cells and batteries are well understood in the art as illustrated by Eidensohn et al., Patent No. 2,925,455, and Miller et al., Patent No. 3,043,898. My invention relies for novelty on certain innovations which in combination provide a practical, low-cost, convenient, and efficient electrical power supply unit.

A specific structural feature of my invention is the use of a gas depolarizing electrode as a part of the housing or casing which confines the electrolyte. Electrodes capable of reducing any electronegative gas may be used; however, as a practical matter, the use of air electrodes is of paramount interest. The term "air electrode" is used in the conventional sense as meaning an electrode which is capable of electrochemically reducing oxygen from ambient air. Such electrodes are, of course, even more efficient in oxygen enriched atmospheres and in pure oxygen. It is further recognized that such electrodes are useful to reduce halogen gases, although there is little practical opportunity for such application. It is generally preferred that the air electrodes employed in the practice of my invention employ boron carbide, spinel, platinum, palladium, silver, or mixtures thereof as an electrocatalyst. Nickel and/or silver incorporation may serve to extend the electrocatalyst. Hydrophobic materials, preferably fluorocarbon polymers, may be usefully employed to bond the electrocatalyst particles and/or to form gas permeable, liquid impermeable coatings for the electrode structure. The electrocatalyst either alone or in combination with a hydrophobic material is preferably suported by a foraminous substrate. Either a conductive or nonconductive substrate may be employed. Williams et al., Patent No. 3,116,170 illustrates a practically useful electrode structure including a porous organic polymer substrate. Carbon and metal conductive substrate supported electrodes utilizing hydrophobic materials are illustrated by commonly assigned application, Niedrach et al., Ser. No. 232,689, filed Oct. 24, 1962.

Various types of electropositive metal anodes useful with gas depolarizing electrodes are known to the art. My invention is particularly useful with electropositive metals which form precipitates when reacted in an aqueous electrolyte. The terms "magnesium anode" and "zinc anode" as hereinafter employed refer to anodes in which the predominant electrochemically active ingredient is magnesium and zinc, respectively, as is conventional practice in the art. Significant amounts of other metals are typically included. for example, commercially available magnesium anodes typically employ in excess of 90 percent by weight magnesium. The remaining weight of the typical magnesium anode is principally aluminum and zinc. The additional anode ingredients may be used to control coulombic efficiency, voltage, or parasitic chemical attack as is well understood in the art or may merely constitute impurities.

Zinc and magnesium anodes are generally low cost and light weight rendering them desirable for inclusion in gas depolarized cells. Both zinc and magnesium anodes, however, suffer the disadvantage of forming precipitate in electrolytes formed of aqueous solutions of alkali and alkaline earth metal halides. This precipitate is formed by both the electrochemical reaction and by parasitic internal chemical reactions. If it is desired to reuse a magnesium or zinc cell, it is necessary to perform an extensive cleaning operation to remove the precipitate. This frequently results in catalyst loss from or damage to the gas electrode. Further, if the precipitate is allowed to dry or cake in the cell, it may become practically impossible to remove. While physical reactivation of such cells for reuse has been a slow and distasteful task, it has been, nevertheless, a practical necessity in view of the high catalyst investment in the gas electrode, particularly in the air electrode.

It is a feature of my invention to envelop at least the portion of the metal anode contacting the electrolyte with a filter which will serve as a convenient, disposable, foraminous receptacle for removing precipitate from a metal-air cell when it is desired to physically reactivate the cell. While practically all foraminous materials are to some extent operative as filters, there are a number of parameters which must be considered in order to achieve highly efficient cell performance. One of the obvious requirements is that the openings in the filter be sufficiently small to physically retain the insoluble precipitate. To this end I prefer to use materials having openings of approximately 1 millimeter mean diameter or less. This corresponds to a mesh size of 25 or higher. An unduly dense filter, however, is undesirable, since it will decrease the ionic mobility, entrap gaseous reaction products formed in the cell, and thereby contribute to polarization of the cell. For this reason it is preferred that the filter should be formed of a material to provide an open area of at least 50 percent. Additionally, the filter material should be wettable by the electrolyte for maximum electrolyte penetrability. Any non-conductive material which is substantially inert toward the electrolyte may be employed including nylons, polyethylene, polyurethane, polypropylene, etc.

Another specific feature of my inventive electrical power source is that available surface water may be employed as an electrolyte or electrolyte constituent. While the use of sea water as an electrolyte has been recognized, we have discovered that fresh water from streams, lakes, ponds, etc., can be successfully employed as an electrolyte constituent despite the presence of natural contaminants. For example, in order to use water from a silt-laden river or rice paddy in a zinc-air or magnesium-air cell constructed according to my invention it is only necessary to allow the readily separable solids to settle and to add table salt. Where time is of the essence in placing a cell in operation, the water can be added to the cell directly by pouring through the filter. While it would be anticipated that organic contaminants in surface water would adversely affect the electrocatalyst in the air electrode, no substantial detriment to the performance of my units has in fact been encountered. While I do not wish to be bound by an particular theory to account for this advantage, it is believed that the insoluble metal hydroxides selectively adsorb natural contaminants from the electrolyte by a mechanism substantially analogous to that of alum conventionally employed in water purification. When a filter is used to hold the precipitate out of contact with an air electrode, chances of oxygen electrode contamination are substantially eliminated.

FIGURES 1 and 2 of the drawing illustrate the combination of an electropositive metal plate 1 and a filter 2. The filter consists of a pair of spaced guides 3 and 4 each provided with a vertical groove 5 to receive an edge of the plate. A piece of foraminous filter material 6 is attached to the guides. The filter material is mounted on the guides in a U-shaped configuration. Both the guides and filter material are formed of nonconductive substances. A bail 7 extends between the guides. The plate 1 is provided with a terminal strip 8 integrally formed therewith extending above the filter.

FIGURE 3 illustrates a cell having the plate and filter mounted in an electrolyte confining casing 10. The casing is formed of a U-shaped frame 11. A metal screen 12 is shown sealed to the opposed major faces of the frame and extending around one edge thereof. Face pieces 13 are sealed to the frame and overlie the edges of the screen. Each of the face pieces is provided with a large window 14. The portion of the screen lying within each window forms a part of a gas permeable, liquid impermeable air electrode 15 co-extensive with the window.

In FIGURE 4 the metal plate 1 is shown enveloped in an alternate filter 20. The filter consists entirely of a filter material. The filter may be shaped to envelop the plate or may be a flat piece of material folded into a U shape and attached to the plate along the upper edge. The filter material may be formed of a non-conductive substance.

FIGURE 5 illustrates a cell 30 comprised of a casing 31 including spaced, non-conductive guides 32 and 33. Each of the guides is provided with a vertical groove 34 to receive an edge of the metal plate. A frame piece 35 is sealingly joined to the lower edge of the guides. Two air electrodes 37 and 38 are sealed to opposite edges of the frame piece and guides. In contrast to the screen supported air electrodes 15 shown in FIGURE 3, the electrodes 37 and 38 are formed of electrocatalyst impregnated carbon plates.

FIGURES 6 and 6a illustrate another modified cell 40 consisting of a cylindrical metal anode 41 having a cup-shaped filter 42 surrounding the anode and attached to the upper portion thereof. A circular insulative support 43 is also attached to the upper portion of the anode. The support sets in an annular ring 44 having an annular shoulder 45. Sufficient clearance exists between the support and ring to allow any gas generated within the cell to be vented. The support and the annular ring together with a cylindrical screen 46 and circular end closure 47 form a casing for the cell. The portion of the screen lying between the annular ring and the end closure forms part of a gas permeable, liquid impermeable air electrode 48. A portion 49 of the screen provides an electrical connection between the air electrode and terminal 50. A second terminal 51 of the cell is connected to the anode.

FIGURE 7 illustrates a preferred portable electric power source 100 comprised of a plurality of cells 101a, b, c, d, and e similar to the cell shown in FIGURE 3. A plurality of spacers 102 are mounted at the corners of the cells to separate adjacent cells and to separate endguards 103 from the end-most cells. Air gaps 104 are formed by the spacers to allow diffusion of air into contact with the air electrodes. Also, optional apertures 105 are shown provided in the end-guards to allow air diffusion into contact with the outer air electrodes of the end-most cells. It is appreciated that the spacers 102 between the end-guards and the end-most cells may be omitted when apertures are provided.

So that the power source 100 may be used as a rugged, portable unit, a closure 106 is pivotally connected to the cells by a resilient or hinged coupling 107. As shown the closure is formed of transparent material such as plastic. The closure includes a wall 108 that forms a top closure for the power source and three integrally united side walls 109, 110, and 111 which extend beyond the edges of the cells on three sides. A pad 112 of gas permeable, liquid impermeable material is mounted on the lower surface of the top closure wall. The pad may be formed of a cloth treated with a hydrophobic material, such as a fluorinated polymer, or, alternately, formed of a porous or cellular material which is selectively penetrable by gas. A plurality of gas ports 118 are provided in the top closure wall.

Terminal strips 113a, b, c, d, and e, which are generally similar to terminal strip 8 in FIGURE 1 are provided for cells 101a, b, c, d, and e, respectively, and extend thereabove. When the closure is mounted in the closed position rather than the open position shown, each of the terminal strips extends through a slot 114 in the selectively permeable pad, an aperture 115 in the top closure wall, and into engagement with electrical connector clip 116a, b, c, d, or e lying thereabove. The connector clips are enclosed in a protective casing 117 which is sealingly united to the upper face of the top closure wall. The clips are preferably coated with a thin lubricant layer.

One terminal 120 of the electrical power source is attached to the top closure wall by a bolt 121. A connector strip 122 is interposed between the top closure wall and the terminal and extends through a slot 123 in the closure. A resilient spring portion 124 of the connector lies interiorly of side wall 110. When the closure is in the closed position and the connector spring portion engages screen 125 of the end-most cell 101a to form an electrical connection with the air electrodes of the cell. A connector strip 126a extends from connector clip 116a, through slot 127a, and to screen 125 of cell 101b. In similar manner connector clips 116b, c, and d are electrically connected to screen 125 of cells 101c, d, and e by connector strips 126b, c, and d, respectively. Remaining connector clip 116e is electrically connected to a second terminal, not shown, by a connector strip 128 and a bolt 129.

FIGURE 8 illustrates a portable electric power source 200 comprised of a plurality of cells 201a, b, c, d, and e. These cells are substantially similar to the cells shown in FIGURE 7. Insofar as the power source 200 differs from power source 100 it is by the addition of an auxiliary electrolyte container 202, which is shown divided into compartments 203a, b, c, d, and e. Cells 201a, b, c, d, and e are connected to compartments 203a, b, c, d, and e, respectively, by conduits 204. If the conduits 204 are small as compared to the total electrolyte storage capability of the cells, it is not necessary to divide the container into compartments.

To illustrate a practical application of the portable power source 200 a converter 205 and an electrical power requiring device 206, such as a field radio, are also shown. Electrical leads 207 and 208 extend between the converter and the power source. Electrical leads 209 and 210 deliver electrical energy at a first voltage level to the device 206. Similarly leads 219 and 220 supply electrical energy at a second voltage level while leads 229 and 230 supply voltage at a third level.

The use of the invention is best illustrated by reference to FIGURES 1–3 inclusive and 7. The closure 106 of the electrical power source 100 is placed in the open position shown in FIGURE 7. In each of the cells 101a, b, c, d, and e is placed an assembled filter 2 and electropositive metal plate 1. The plate is mounted in the filter by sliding the edges of the plate into the grooves 5 of the spaced guides 3 and 4. With the plates and filters in position the closure may be closed and the power source stored for any desired length of time without any adverse effect. When it is desired to activate the source, an electrolyte is added to each of the cells. When the closure is lowered the connector clips 116a, b, c, d, and e engage the terminal strips 113a, b, c, d, and e, respectively, of the cell plates. At the same time, the resilient spring portions 124 of the connector strips 122 and 126a, b, c, and d contact the screens 125 of cells 101a, b, c, d, and e, respectively. This results in the cells being connected in series between the terminals 120 of the power source.

As the power source is used the electropositive plates react with the electrolyte. If zinc or magnesium is used to form the plates and alkali or alkaline earth halide solution is employed as the electrolyte, zinc or magnesium-bearing precipitates will be formed. These reaction products are held by the filter out of contact with the air electrodes of each cell. At the same time gas formed by parasitic reactions within each cell is selectively vented through pad 112 and gas ports 118.

When the electrical power obtainable from the power source either falls off markedly or fails, the power source may be quickly and conveniently reactivated. The closure 106 is moved to the open position shown in FIGURE 7. Each filter is then removed merely by grasping the bail 7 thereof. This also removes all solid precipitate formed by reaction of the electropositive plate as well as any unreacted remnants of the plates. The filters may be discarded and replaced with new anodes and filters, or the filters may be washed free of precipitate and new plates inserted. If the electrolyte is low, a make-up amount may be added at this time.

The operation of the alternate structural forms shown in FIGURES 4–6 inclusive is substantially similar to that described above. With regard to the cell 30 it is noted that since the filter 20 is bonded directly to the portion of the plate lying above the electrolyte no bail is necessary. The filter is removed merely by grasping the upstanding terminal strip of the depleted plate or by grasping the filter directly. In cell 40 the cylindrical metal anode 41 can be replaced merely by grasping terminal 51 and lifting insulative support 43 along with the filter 42 attached to the support or the upper, unreacted portion of the anode.

The electrical power source 200 shown in FIGURE 8 operates substantially similarly to the power source 100. A significant advantage of the power source 200 is the auxiliary electrolyte container 202 attached through conduits 204. This permits the power source to operate for long periods at low power densities without attention, since the additional electrolyte substantially eliminates the possibility that sufficient electrolyte will evaporate to inactivate a large fraction of the surface area of the plates. The container 202 may also prove a useful auxiliary in operating in low humidity environments.

As shown in FIGURE 8 the power source 200 supplies to the power requiring device 206 through the converter 205 electricity at three distinct voltage levels. A first voltage level is supplied by leads 209 and 210; a second by leads 219 and 220; and a third by leads 229 and 230. If, for example, the power requiring device is a field radio receiver and transmitter, the power source 200 replaces a plurality of dry cell batteries of various sizes and ratings. Accordingly, logistic requirements of the radio are significantly simplified. Further, the power source can be stored with the field radio and need not be handled separately as is required when dry cells are employed.

While the structural features of electrical power supply units have been described with respect to certain illustrative specific embodiments, it is appreciated that numerous modifications would be obvious to one skilled in the art. For example, in the units shown in FIGURES 1–5 inclusive one of the air electrodes could be replaced by an inert casing wall. Applying this design to the unit 100 in FIGURE 7, spacers 102 could then be omitted between certain of the cells. The end guards 103 on the unit 100 could be omitted. Alternately, apertures 105 in the end-guards may be omitted. While the unit 100 is shown with the cells connected in series, it is appreciated that cells could as well be connected in parallel or in any other desired manner. In unit 40 the end closure 47 could be omitted and replaced by an additional portion of air electrode.

My invention may be better understood by reference to the following specific examples, which are set out for purposes of illustration rather than limitation.

In each experiment, except as otherwise indicated, a magnesium-air cell was used constructed as shown in FIGURE 3. The air electrodes on each side of the cell had an active surface area of 64 cm.$^2$. The air electrodes were spaced 9 mm. apart. The inside dimensions of the casing were 9.1 by 10 cm. The magnseium plate used was 1 mm. in thickness with an areal extent, exclusive of terminal strip, of 7.7 by 8.7 cm. A silver screen was used to form the air electrodes. Each electrode included a mixture of finely divided catalyst and polytetrafluoroethylene with a thin overlying, exterior wet-proofing film of polytetrafluoroethylene formed according to conventional techniques. In each experiment polyethylene guides were used, and in Examples I to V inclusive a 7 percent by weight solution of sodium chloride in distilled water was employed. As is conventional practice 3 percent by weight aluminum and 1 percent by weight zinc was alloyed with the magnesium to improve its structural integrity.

Example I

A magnesium-air cell as above set out was provided with a nylon filter material having a mean pore diameter of $1/_{60}$ inch and a free area of 55 percent. The cell was operated at a current density of 1.2 ma./cm.$^2$ and a potential of approximately 1.3 volts. When the magnesium plate had been substantially entirely consumed, the filter with the precipitate contained therein was removed from the casing. It was noted that substantially all of the precipitate was contained by the filter material. The filter was easily removed, and during operation negligible gas entrapment in the filter material was noted.

Example II

The experiment set out in Example I was repeated using nylon having ⅛ inch mean pore diameter and a free area of 80 percent. No significant variations in current density, potential, or gas entrapment were observed. Upon depletion of the magnesium plate, however, the filter was found difficult to remove. Further, a large amount of magnesium hydroxide precipitate was noted to remain in the cell.

Example III

The experiment set out in Example I was repeated using nylon having $1/_{128}$ inch mean pore diameter and 40 percent free area. With a current density of 1.2 ma./cm.$^2$ the potential was noted to be only 0.8 volt. Extensive gas entrapment was noted. While precipitate containment was good, the filter unit was difficult to remove.

Example IV

The experiment set out in Example I was repeated using a cotton gauze having a mean pore diameter of $1/_{64}$ inch and a free area of 50 percent. At a current density of 1.2 ma./cm.$^2$ a potential of 0.6 volt was noted. Extensive gas entrapment was observed. Containment of the precipitate was good, however, the filter could not be easily removed. It is believed that the cotton was chemically attacked within the cell thereby causing it to stick to the air electrodes and resist removal.

Example V

The experiment set out in Example I was repeated using cotton gauze having a mean pore diameter of $1/_{200}$ inch and a free area of 8 percent. At a current density of 1.2 ma./cm.$^2$ a potential of only 0.2 volt was noted. Extensive gas entrapment was observed. Containment of the precipitate was good, however, the filter could not be easily removed. Again, chemical attack of the cotton was believed responsible for the difficulty in removal.

Example VI

For purposes of simulating contaminated ground water to 3 liters of water 30 grams of a bacteria-laden humus and 75 grams of kaolin were added and mixed for 24 hours. After allowing one hour for settling, the supernatant liquor was decanted. To the liquor was added 7 percent by weight sodium chloride and sufficient sodium sulfide to give a 0.1 percent by weight concentration thereof. The electrolyte thus formed was then divided into three aliquot portions.

Three cells as described above were provided, except that no filter material was attached to the guides. One portion of the electrolyte was immediately added to a first of these cells, here designated Cell A. The second and third portions of the electrolyte were treated with potassium permanganate until a coloration could be discerned after allowing the electrolyte to stand five minutes. The second portion of the electrolyte was added to Cell B. To the third portion of the electrolyte was added a flocculent in a concentration of 5 p.p.m. The supernatant electrolyte was decanted into Cell C.

Each of the cells were run at a current density of 7.5 ma./cm.$^2$ for three weeks with recharging and cleaning taking place at two-day intervals. Cell A exhibited a potential of from 1.28 to 1.25 volts. Cells B and C exhibited a voltage of approximately 1.32 volts.

Example VII

Twenty cells identical to that tested in Example I were used as controls. Ten cells were tested identical to the cell of Example I, except that Mohawk River water was substituted for distilled water. The water was greenish-brown with a pH of 7.8. The following impurities were noted:

|  | P.p.m. |
|---|---|
| Carbon dioxide | 2 |
| Dissolved oxygen | 9.4 |
| Chloride | 9 |
| Alkali | 82 |
| Hardness | 106 |

Five test cells and ten controls were tested for 30 days at 85° F. and at 105° F. with two-day recharging intervals. The output of both controls and test cells was approximately equivalent with the test cells giving slightly better performance. At the end of thirty days every test cell provided a power output equal to or better than that of the controls.

Example VIII

To illustrate the scope of my invention a number of cells were tested structurally similar to the magnesium-air cell described above but having instead a zinc anode. A filter was employed in each instance of the type used in Example I. The cells were tested with electrolytes such as used in Examples VI and VII. The cells performed similarly in each test. The results are set out in Table 1:

TABLE 1

| Potential (volts): | Current density (ma./cm.$^2$) |
|---|---|
| 1.1 | 0 |
| 0.76 | 10 |
| 0.65 | 20 |
| 0.55 | 30 |

When the zinc anode in each cell had been substantially entirely consumed, the filter with the precipitate contained therein was removed from the casing. It was noted in each instance that substantially all of the precipitate was contained by the filter material. The filters were easily removed, and during operation negligible gas entrapment in the filter material was noted.

Having now described, illustrated, and exemplified certain preferred forms of my invention, it is intended that the scope of the invention be determined by reference to the following claims.

What I claim as new and desire to secure by Letters Patent of the United States is:

1. An electrical power source comprising means for confining an electrolyte, said confining means comprising a casing with at least one window portion, and a gas depolarizing electrode covering the window portion, a precipitate producing solid metal anode removably positioned within the casing spaced from the depolarizing electrode and including at least a portion adapted to contact an electrolyte, and filter means removably positioned within the casing enveloping at least the portion of the anode adapted to contact the electrolyte.

2. An electrical power source according to claim 1 in which said depolarizing electrode is an air electrode.

3. An electrical power source according to claim 1 in which said metal anode is comprised of magnesium.

4. An electrical power source according to claim 1 in which said metal anode is comprised of zinc.

5. An electrical power source according to claim 1 in which said filter means is comprised of an inert filter material having a mean pore diameter of 1 mm. or less and a free area of at least 50 percent.

6. An electrical power source according to claim 1 in which said depolarizing electrode is cylindrical.

7. An electrical power source according to claim 1 additionally including an electrolyte.

8. An electrical power source according to claim 7 in which said electrolyte is comprised of ground water.

9. An electrical power source according to claim 7 in which said electrolyte consists essentially of water and metal salt chosen from the group consisting of alkali halide and alkali earth halide.

10. A portable electrical power source comprising a plurality of means for confining separate identical electrolytes, the confining means connected together with spacing therebetween, each of said confining means comprising a casing with at least one window portion, and an air electrode covering the window portion, a precipitate producing solid metal anode removably positioned within each casing spaced from its associated air electrode and including at least a portion adapted to contact an electrolyte, filter means removably positioned within each casing enveloping at least the portion of the associated anode adapted to contact the electrolyte, a cover for the casings, the cover including a gas permeable, liquid impermeable layer, and electrical connectors for the respective air electrodes and anodes.

11. An electrical power source according to claim 10, in which the solid metal anode in each of the casings is comprised of magnesium.

12. An electrical power source according to claim 10, in which the solid metal anode in each of the casings is comprised of zinc.

References Cited

UNITED STATES PATENTS

| 435,688 | 9/1890 | Edison | 136—86 |
| 1,163,834 | 12/1915 | Little | 136—86 |
| 3,026,364 | 3/1962 | Jackson et al. | 136—86 |
| 3,043,898 | 7/1962 | Miller et al. | 136—86 |

ALLEN B. CURTIS, Primary Examiner